Figure 1:
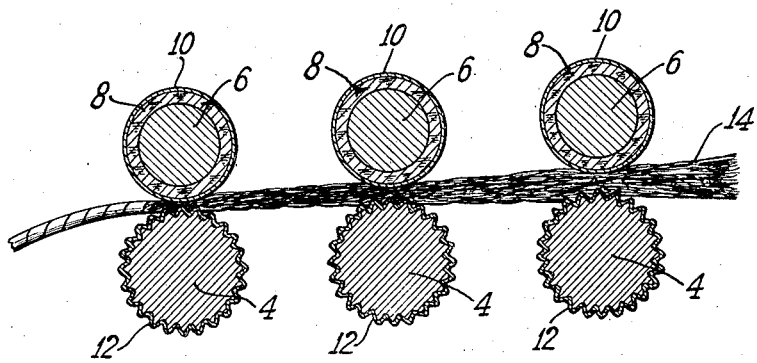

April 20, 1943. F. J. TOBIAS ET AL 2,316,824

METHOD AND APPARATUS FOR HANDLING MATERIALS

Filed April 16, 1940

INVENTORS
FRED J. TOBIAS
ROBERT F. JESSEN
BY
John M. Leach

Patented Apr. 20, 1943

2,316,824

UNITED STATES PATENT OFFICE 2,316,824

METHOD AND APPARATUS FOR HANDLING MATERIALS

Fred J. Tobias, Ridgewood Plateau, N. Y., and Robert F. Jessen, Trenton, N. J., assignors to Sylvania Industrial Corporation, Fredericksburg, Va., a corporation of Virginia Application April 16, 1940, Serial No. 329,888

9 Claims. (Cl. 175—264)

The present invention relates to the handling of materials. More particularly, it relates to a method and apparatus for performing operations on materials which are subject to attraction by electrically charged bodies forming elements of the apparatus or equipment used in performing the operation and passed over or near to by the materials during or incidental to the operations.

In the handling of materials which are subject to attraction by electrically charged bodies heretofore, for example, in the handling of fibres during carding, spinning, drafting and the like, considerable difficulty has been experienced due to the fibres being attracted to and clinging to elements of the apparatus employed, and thereby eventually clogging or otherwise producing stoppage in the apparatus. Numerous attempts have been made to overcome these difficulties as, for example, by electrically charging the apparatus elements in an effort to overcome the electro-static charges existing on the elements and also to dissipate the charges by grounding the elements. These efforts have been expensive because of the character of the apparatus involved and have been largely unsuccessful because of inability to properly control and direct the charges and to utilize the apparatus in connection with the large number of elements included in the number of machines normally employed in commercial operations.

It is an object of the present invention to provide a method and apparatus for overcoming the above-mentioned difficulties.

It is a further object of the present invention to provide a method of handling materials subject to attraction by electrically charged bodies so that the materials will not be attracted by bodies passed over or near to by the materials during the handling operations.

It is another object of the present invention to provide a method of handling mixtures of fibrous and pulverulent materials subject to attraction by electrically charged bodies so that the materials will be repelled by the bodies over which or in the vicinity of which the materials pass instead of being attracted by the bodies or elements.

It is a further object of the present invention to provide a method of handling mixed fibres or pulverulent material so as to prevent separation of one or more constituents from the mixture.

It is also an object of the present invention to provide an apparatus for handling materials which will not attract the materials.

It is a still further object of the present invention to provide an apparatus for handling mixed materials which will not attract and/or separate constituent elements from the materials.

Other objects and advantages of the invention will be apparent to those skilled in the art as the description of the invention proceeds.

The invention in general comprises applying to elements of apparatus or equipment which are passed near to or contacted by mixtures of fibrous and pulverulent materials subject to attraction by electrical charges during handling operations quantities of the same material as that being handled or material capable of receiving electrical charges of such nature as to repel the materials being handled. The apparatus of the invention basically may take the form of apparatus or equipment utilized in handling mixtures of fibrous and pulverulent materials capable of receiving electrical charges, which apparatus has the elements thereof which contact or are passed by the said materials formed of or surfaced by materials capable of receiving electrical charges of such type as to prevent the materials being handled from being attracted to the elements.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

Figure 2:
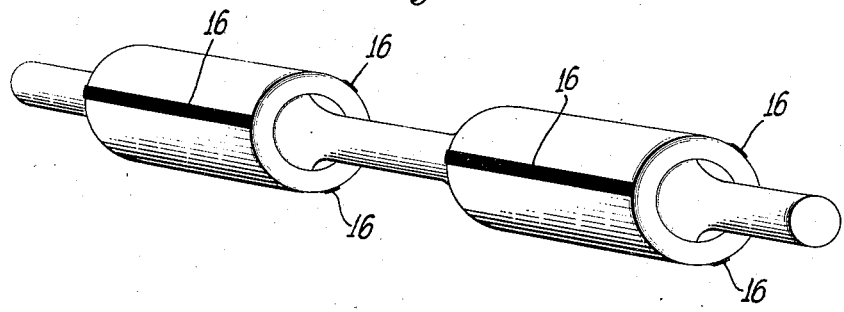

For a more detailed description of the invention reference should be made to the drawing in which:

Fig. 1 is a diagrammatic cross sectional view of a representative form of roller apparatus embodying the present invention;

Fig. 2 is a perspective view of one of the rollers illustrated in Fig. 1, but embodying a different form of the invention; and The present invention is applicable to any handling operation involving mixtures of fibrous and pulverulent materials which are attracted to elements of the handling equipment because of the existence of electrical charges on the materials and/or on the machine elements, but for the sake of explanation the invention will be described in connection with textile machinery of the type used to handle fibrous material and in connection with machinery for fabricating articles from such materials. In the handling of certain fibrous material, both natural, synthetic and mixtures of both, there is a marked tendency for the fibres to be drawn out of slivers, rovings and other untwisted or slightly twisted fibrous materials by the rollers or other elements which the material passes near to or in contact with during carding, drafting, spinning, doubling and the like operations. The fibres frequently curl or lick around one or both of the rollers of a pair between which the roving or the like is passed and very shortly build up such a large fibrous mass on the rollers as to prohibit further operation of the machine. Thus stoppage of the machine becomes necessary in order to clear the fibres from the rollers before normal operation can again be resumed.

It has been found that this tendency on the part of fibres to cling to elements of machines and equipment can be entirely eliminated by disposing the same material as that from which the fibres are made, or materials capable of receiving like electrical charges, over the entire surfaces or over predetermined areas of the surfaces of the machine elements.

Referring to Fig. 1 there is represented, diagrammatically in cross section, three pairs of cooperating rollers of a conventional type of drafting frame, the lower rollers of the frame being indicated by reference numerals 4. These rollers are usually formed of steel and are usually fluted as illustrated to provide corrugated surfaces on the rollers which can grip and draft the fibres passing through the drafting frame. These rollers are suitably driven by any desired mechanism of conventional design which is not illustrated.

The upper rollers of the pairs are indicated by reference numerals 6. These rollers are usually urged toward the bottom rollers of the pairs by weights or the like which are not illustrated. In the customary practice of the art the rollers 6 are usually formed of steel cores with coverings formed of relatively resilient materials, such as agglomerated cork, leather or rubber-like material.

In this form of the invention the rollers 6 have coatings 10 applied over the cork or the like coverings 8 and/or the rollers 4 have coatings 12 applied over both the ridges and depressions of the fluted areas. The coatings 10 and 12 are formed of a material which will acquire a like charge to that acquired by the material forming the fibres of the sliver 14, or of the same material as the fibres. Since the roller surfaces and the fibres both receive the same polarity of electrical charge, for example, electro-static charge, the fibres will be repelled by the rollers so that there will be no tendency for the fibres to cling to and wrap around the rollers.

From the drafting rollers 4 and 6, the sliver is passed to a machine for performing a succeeding operation, for example, to a down stroke twister.

It is to be understood that machines which operate on the fibres prior to the drafting operation, as well as subsequent thereto, will be constructed in accordance with the present invention if such is desired.

The present invention is particularly advantageous for use in connection with mixed fibrous material, for example, a sliver formed of 90% viscose rayon and 10% vinyl resin fibres of the type commonly sold under the trade name "Vinyon." It has been found that the "Vinyon" fibres are particularly subject to attraction by the leather or cork coverings 8 of the drafting rolls to such an extent that in a combination of fibres having the proportions previously mentioned, a large percentage of the "Vinyon" fibres will be removed by the rollers 6 during passage of a sliver through the drawing frame. When it is considered that only a relatively small percentage of the "Vinyon" fibres existed in the original sliver, it can be seen that the extraction of even 30% of the "Vinyon" fibres from the sliver greatly changes the fibrous mixture originally formed. The extraction of the "Vinyon" fibres may be completely eliminated by coating the rollers 6 with "Vinyon" resin, such as by applying an adhesive to the roller surfaces and dusting powdered "Vinyon" resin thereover, applying a lacquer-like coating of "Vinyon" to the rollers, shrinking a sleeve of "Vinyon" resin over the rollers or by casting or otherwise forming the rollers from "Vinyon" resin or with a "Vinyon" resin outer cover in place of the cork or leather cover.

If the "Vinyon" fibres show a tendency to cling to the bottom rollers 4, this tendency can be overcome also by providing the bottom rollers with a coating 12 of "Vinyon" resin or by forming the rollers 4, as explained above, in connection with rollers 6.

The rollers or other machine elements may be formed of, comprise or be impregnated or coated with some other material or composition which will acquire a charge like that acquired by the fibres to be handled instead of employing the same material as the fibres for this purpose.

When a "Vinyon" resin lacquer is used to form the coating, the lacquer may be prepared by dissolving "Vinyon" resin in any well known solvent and adding any well known plasticizer. The formation of "Vinyon" resin lacquers is well known to those skilled in the art so that a detailed description of the lacquer preparation is not deemed necessary, and particularly in view of the fact that many different lacquer compositions can be employed to form a lacquer which will adhere to the rollers.

In the event that a coating of "Vinyon" resin such as 10 causes the other fibres of the sliver to be attracted to the rollers 4 or 6, this can be avoided by applying the lacquer to the rollers in stripes as illustrated in Fig. 2 by reference numerals 16. The width of the stripes 16 and the number of stripes employed will be governed by the lengths of the fibres forming the sliver and the proportion between "Vinyon" resin fibres and the other fibres forming the sliver. The width of the stripes and the number of stripes employed will therefore vary in each instance and can be easily determined by trial in connection with any given sliver construction.

Instead of applying the lacquer in stripes, the same result can be obtained by adding a material to the resin coating for example, by adding it to the lacquer, which has the same electro-static properties or is the same material as the other fibres of the sliver. Such a lacquer may be applied over the entire area of the rollers and will result in all of the fibres forming the sliver structure being sufficiently repelled by the rollers to prevent the relative positions of the fibres in the sliver from being disturbed during the handling operations.

By way of explanation and not in limitation of the invention, the following specific example of one application of the invention will be given:

A sliver construction comprising approximately 92% viscose rayon and 8% "Vinyon" resin fibres was successively passed through a high speed drafting frame by coating the upper leather covered rolls of the frame only with a lacquer comprising 50 parts of "Vinyon" resin and 50 parts of cellulose acetate dissolved in a sufficient quantity of acetone to make the lacquer capable of being applied by brush and having sufficient di-butyl phthalate added to properly plasticize the resulting lacquer in a well known manner. The consistency of the lacquer and the amount of plasticizing required of course varies with the type of surfacing material over which the lacquer is applied. With the rollers so coated no "Vinyon" resin fibres and no rayon fibres were attracted by the rollers 6, which enabled the sliver to be economically and rapidly handled.

Instead of employing "Vinyon" resin to form the coating in the example previously given, any soluble material which has the same electrostatic properties as "Vinyon" resin could be employed.

It is, of course, within the purview of the present invention to handle slivers formed of many other fibrous materials and mixtures of fibrous materials in addition to those given in the specific example. For example, cellulose esters such as cellulose acetate, cellulose ethers, cellulose ether-esters and other cellulosic derivatives; aliphatic derivatives of methacrylic acid, urea resins, resins formed by the condensation of diamines with dicarboxylic acids, such as nylon, gelatine, other synthetic resins, rubber hydrohalides as well as natural materials such as cotton, silk, wool and bast fibres.

Instead of striping the rollers as illustrated in Fig. 2, the roller surface may be formed of alternate segments of the different materials.

In practicing the present invention best results can be obtained by taking into consideration the atmospheric conditions under which the materials are to be handled, since the relative humidity and temperature under which the operations are to be performed directly affect the electrostatic conditions existing in regard to the materials, and the quantity of the coating applied to the rollers or other elements should be varied accordingly. The amount of variation required can be determined readily by trial. In general, the drier the atmosphere the more the materials being handled are affected by electro-static charges.

The invention is also applicable to handling operations involving pulverulent material, particularly where mixtures of such materials are employed and there is a tendency for certain constituents of the mixture to be extracted during the handling operations.

Constituents may be removed from a mixture of fibres, pulverulent materials and the like by placing a material having the capacity to receive the opposite polarity of electrical charge as the constituent to be removed upon the surfaces of rollers, plates and the like with which the mixture comes in contact during handling, the surfacing material being applied in sufficient quantity to set up an attractive force of sufficient magnitude to extract the desired constituents from the mixture. In the case of mixed fibres, the attracting force may be made of just sufficient magnitude to extract certain constituent fibres partially from the mixture so as to cause them to protrude and thereby form an effect yarn such as angora, and the like.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

We claim:

1. The method of handling mixed light-weight fibrous materials, at least one constituent of which is subject to attraction and displacement by electrically charged bodies which are approached by the material during handling operation, comprising applying to the surfaces of said bodies a material capable of receiving the same polarity of electrical charge as the material subject to attraction to cause the mixed fibrous materials to be thereby repelled by the bodies, so as to avoid undesirable displacement of the fibrous materials by the bodies.

2. The method of handling mixed light-weight fibrous materials, at least two constituents of which are subject to attraction and displacement by electrically charged bodies which are approached by the material during the handling operation but which constituents are attracted by charges of different polarity, comprising applying to the surfaces of the said bodies a material capable of receiving the same polarity of electrical charge as one of the said constituent materials to thereby repel said constituent material but being applied in insufficient quantity to attract the other of said constituent materials.

3. The method of handling mixed light-weight fibrous materials including at least two constitutents subject to attraction and displacement by electrically charged bodies which are contacted by the material during the handling, comprising applying to the surfaces of the said bodies in predetermined areas a material capable of receiving a charge which will repel one of said constituent materials but applying said surfacing material in such limited areas as to be incapable of attracting the other of said constituent materials.

4. The method of handling mixed light-weight fibrous materials including at least two constituents subject to attraction and displacement by electrically charged bodies which are contacted by the material during a handling operation but are attracted by charges of different polarity, comprising applying to the surfaces of the said bodies a mixture of materials capable of receiving charges of different polarity to cause the material being handled to be thereby repelled by the bodies so as to avoid undesirable displacement of the fibrous materials by the bodies.

5. An apparatus for handling materials, comprising a roller in contact with which the material passes during operation of the apparatus and a coating disposed over at least a part of said roller and comprising a composition containing at least two elements which are capable of receiving electrical charges of different polarity.

6. The method of handling mixed, light-weight, fibrous materials, at least two constituents of which are subject to attraction and displacement by electrically charged bodies which are approached by the material during the handling operation but are attracted by charges of different polarity, comprising applying to the surfaces of said bodies a coating composition containing at least two elements which are capable of receiving electrostatic charges of different polarity.

7. The method of handling mixed, light-weight, fibrous materials, at least two constituents of which are subject to attraction and displacement by electrically charged bodies which are approached by the materials during the handling operation but are attracted by charges of different polarity, comprising applying to the surfaces of said bodies over discontinuous areas a coating material capable of receiving the same polarity of electrostatic charge as one of the said constituent materials and which is the opposite of the electrostatic charge which the surfaces of the said bodies are capable of receiving, to thereby repel both of said constituents so as to avoid undesirable displacement of the fibrous materials by the bodies.

8. The method of handling a sliver comprising fibers formed from viscose and fibers comprising a vinyl resin comprising passing the said sliver over rotating rollers coated at least over portions of their areas with a lacquer comprising a vinyl resin and cellulose acetate.

9. The method of handling a mixture of resin fibres and other fibres, in which mixture the resin fibres are subject to attraction by electrically charged bodies which are approached by the material during the handling operation, comprising applying to the surfaces of said bodies a material capable of receiving the same polarity of electrical charge as carried by the resin fibres to cause the mixed fibrous materials to be thereby repelled by said bodies so as to avoid undesirable displacement of the fibres by the bodies.

FRED J. TOBIAS.
ROBERT F. JESSEN.